United States Patent [19]
Buchanan et al.

[11] Patent Number: 5,395,597
[45] Date of Patent: Mar. 7, 1995

[54] SOLIDS FEEDER WITH INTEGRATED SUPPLY OF CARRIER GAS

[75] Inventors: John S. Buchanan, Hamilton; Hans J. Schoennagel, Pennington, both of N.J.

[73] Assignee: Mobil Oil Corporation, Fairfax, Va.

[21] Appl. No.: 148,300

[22] Filed: Nov. 8, 1993

[51] Int. Cl.$^6$ .......................... B05B 11/06; B01J 8/18
[52] U.S. Cl. .................... 422/145; 222/633; 422/232
[58] Field of Search ............... 422/145, 213, 232; 222/630, 634, 631, 632, 633

[56] References Cited

U.S. PATENT DOCUMENTS

| | | | |
|---|---|---|---|
| 913,816 | 3/1909 | Eckardt | 222/633 |
| 2,493,723 | 1/1950 | Lynn | 222/633 |
| 2,580,580 | 1/1952 | Nicolle | 222/633 |
| 3,249,262 | 5/1966 | Barr et al. | 222/630 |
| 4,201,317 | 5/1980 | Aleff | 222/447 X |
| 4,978,441 | 12/1990 | Buchanan et al. | 208/113 |
| 5,238,150 | 8/1993 | Williams | 222/390 X |

Primary Examiner—Robert J. Warden
Assistant Examiner—Robert Carpenter
Attorney, Agent, or Firm—Alexander J. McKillop; Malcolm D. Keen; Richard D. Stone

[57] ABSTRACT

An apparatus for fluidized transport of solids, e.g., catalyst to a pilot plant FCC unit. Carrier gas flow is generated by compressing a sealed bellows to displace gas and an exit tube attached to the bellows into a solids reservoir. A confinement baffle in the solids reservoir controls solids flow and aids refilling. An auxiliary breather tube with an outlet in the solids reservoir can fluidize solids as the bellows expands.

12 Claims, 2 Drawing Sheets

SOLIDS FEEDER WITH INTEGRATED SUPPLY OF CARRIER GAS

FIELD OF THE INVENTION

This invention relates to devices for transferring solids from a reservoir by entrainment in a gas stream.

DESCRIPTION OF RELATED ART

Our earlier U.S. Pat. No. 4,978,441, which is incorporated by reference, disclosed a device for delivering solid particulates such as FCC catalyst. Our apparatus was especially suited for delivering small amounts of FCC catalyst to an FCC pilot plant. A moving cup feeder was slowly raised into an exit tube in a device with an external gas supply. As the cup moved up the gas would flow into the exit tube, entraining the catalyst or particulates and carrying them out the exit tube.

While the device works well, we wanted to improve it so that there would be fewer moving parts. One of the most troublesome areas was the moving cup, and another was the need for an external gas supply.

We discovered a way to overcome the disadvantages of our prior design, and improve it in other ways. Two of the most troublesome aspects of our prior device could be eliminated by using an integral bellows to deliver fluidizing gas, and attaching the exit tube to the bellows. This allowed:

gas/solids metering control by internal geometry rather than an external flow meter, and the solids in the cup to remain stationary, with the exit tube moving rather than the cup.

This approach relied on careful sizing of the bellows cross sectional area relative to the particulates cup area and size of the exit tube to determine gas/solids ratios. The gas-solids ratio is fixed by the relative size of the bellows to the solids cup. The delivery rate of solids is controlled by the rate of compression of the bellows.

By adding a confinement tube in the solids reservoir, we could significantly improve the metering capability of the device, and provide for multiple uses. A vacuum relief tube permitted refilling of the confinement tube by fluidizing solids in the reservoir.

BRIEF SUMMARY OF THE INVENTION

Accordingly, the present invention provides an apparatus for delivering solid particulates comprising a compressible sealed vessel containing a volume of gas and an outlet for fluidizable solids entrained in gas; a solids reservoir within said sealed vessel; an exit tube movable relative to said solids reservoir for fluidizable solids having an outlet within said reservoir and an outlet connected to said outlet of sealed vessel, said exit tube descending into said reservoir as said sealed vessel is compressed.

In another embodiment, the invention provides an apparatus for delivering solid particulates comprising a compressible sealed vessel having in an upper portion thereof a compressible bellows having an upper horizontal surface separated from a lower horizontal surface by an accordion fold bellows and containing a volume of gas and an outlet for fluidizable solids entrained in gas; a solids reservoir beneath and in open fluid communication with said sealed vessel and affixed to or within said lower horizontal surface, said solids reservoir having an open, vertical, cylindrical tube solids confinement means disposed within said reservoir, said confinement means having an opening at an upper portion thereof receiving an exit tube for fluidizable solids and an opening at a lower portion thereof receiving solids from said solids reservoir; said exit tube for fluidizable solids connected at one end to said upper collapsible surface and at another end thereof to an inlet descending into said reservoir as said bellows is compressed.

In a process embodiment, the present invention provides a method of dispensing fluidizable solids comprising charging said fluidizable solids to the above apparatus and compressing said apparatus to displace gas from said sealed vessel and remove solids by entrainment into said exit tube.

DETAILED DESCRIPTION

Figure 1:
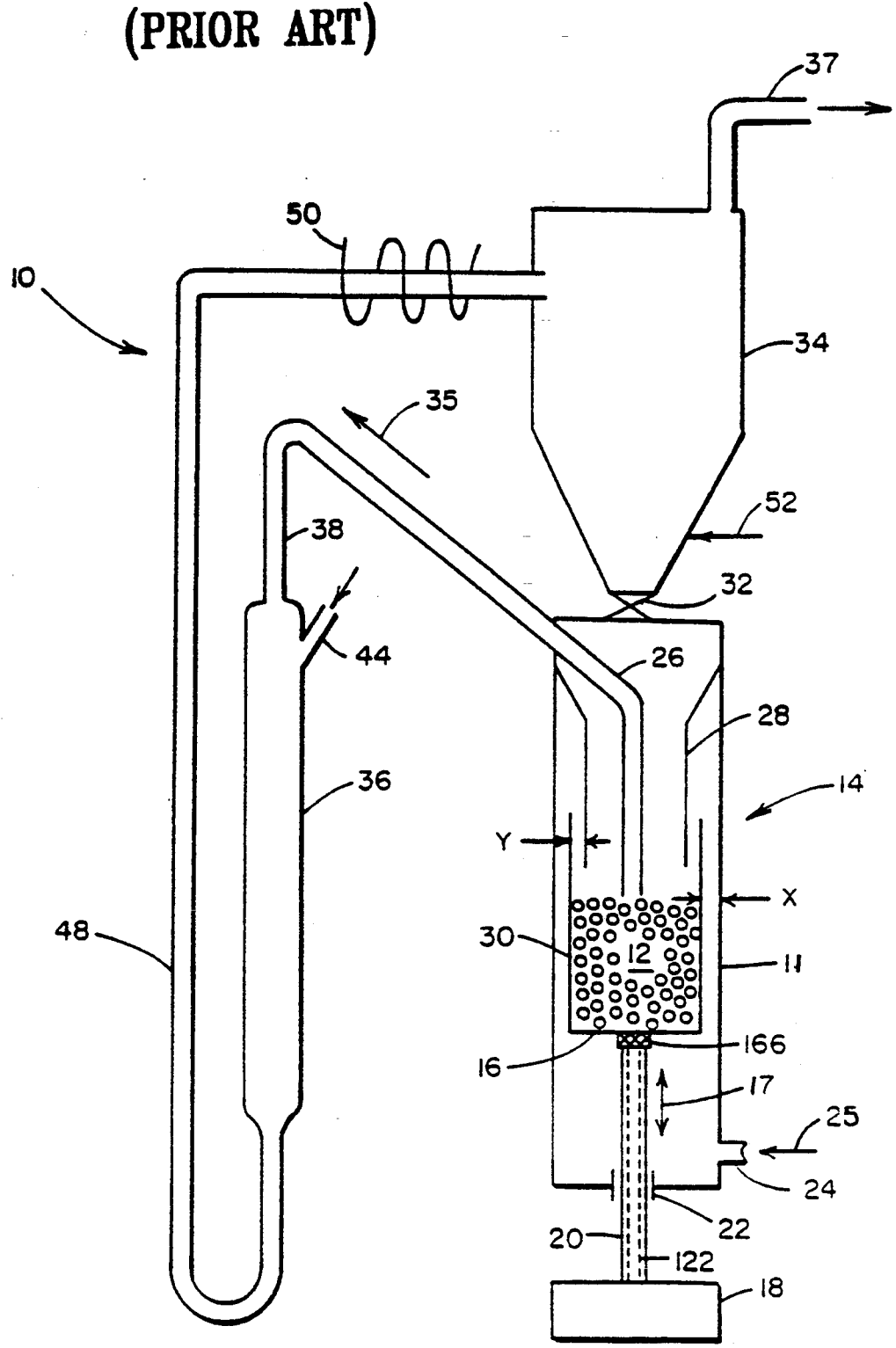
FIG. 1 (Prior Art) is FIG. 1 of our U.S. Pat. No. 4,978,441, showing a moving cup particulate delivery apparatus.

The invention can be better understood with reference to the prior art, reviewed with FIG. 1 (Prior Art).

Referring now to the drawings, a laboratory and/or pilot plant FCC riser system is generally illustrated at 10 in FIG. 1. A source of solid particulates 12 is maintained within a particulate solids delivery system 14 in which piston 16 is reciprocally movable along the directions of arrow 17 relative to cylinder 11. Means 18 of known hydraulic, pneumatic, mechanical or electrical construction are provided for reciprocating piston 16 by means of shaft 20 passing through opening 22 in cylinder 11. A seal means (not shown) can be provided in opening 22 so as to prevent loss of pressure between shaft 20 and the cylinder wall surrounding opening 22. Input means, such as conduit 24, are provided so that a carrier fluid, such as nitrogen or steam, may enter the lower portion of cylinder 11 in the direction of arrow 25. An exit tube 26 is provided in fluid communication within the space bounded by piston 16 and cylinder 11 so as to deliver fluidized solid particulates to a point where they will be mixed with a hydrocarbon feedstock. Piston 16 is provided with a cup-like extension 30 so as to further define the space within cylinder 11 in which the fluidized solid particulates may occupy. A suitable baffle 28 may be provided to prevent particles from splashing out of the cup in the event of vigorous fluidization. When used in combination with baffle 28, extension 30 is dimensioned so as to telescope with baffle 28. Although exaggerated in FIG. 1, it is to be understood that the clearance X between piston 16 and cylinder 11, as well as the clearance Y between the cup-like extension 30 of piston 16 and baffles 28 are much smaller than actually shown. A manual or remotely controllable valve 32 permits return of partially spent catalyst from stripper 34 to the source of solid particulate 12. The fluidized particulates, exiting the particulate delivery system 14, via exit tube 26, travel in the direction of arrow 35 until they are mixed with the hydrocarbon feedstock introduced into reaction tube 36 from conduit 44.

Figure 2:
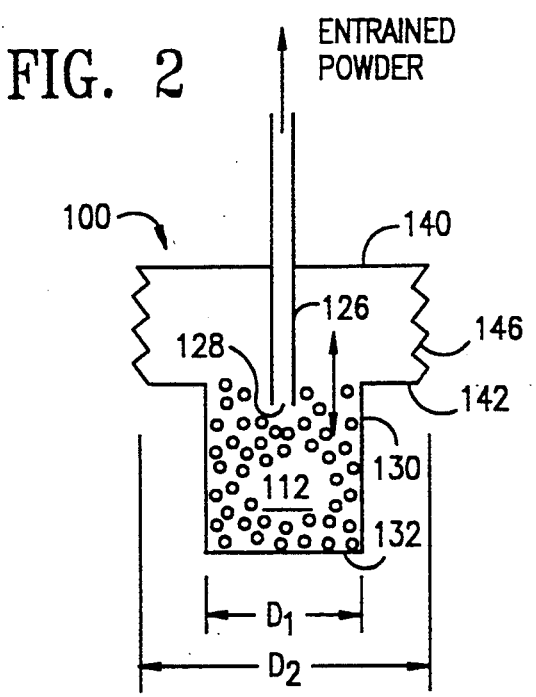
FIG. 2 shows a cross sectional view of a single use particulate delivery apparatus of the invention.

FIG. 2 (Invention) shows a cross sectional view of a solids dispensing device, which is especially suited to single uses. Dispenser 100 consists of a solids cup 130 sealed to bellows 146. When bellows 146 is compressed by forcing together upper and lower bellows surfaces 140 and 142, respectively, gas is displaced from the bellow to the inlet to outlet tube 126, which is affixed at an upper portion thereof to upper bellows surface 140. Tube 126 has an opening 128 extendible upon bellows compression into a solid bed of particulates 112 within cup 130.

The ratio of fluidizing gas to solids is determined by the ratio of the cross sectional area of the bellows to that of the particulate cup. This may be determined by measuring the ratio /f their diameters, D1 and D2, as shown in the figure and making appropriate calculations.

Diameter ratios (D2/D1) of 1 to 5 are suitable. Ratios of 2.5–4 are preferred, since for many powders this would provide sufficient gas flow for dilute phase transport up through the outlet tube.

Figure 3:
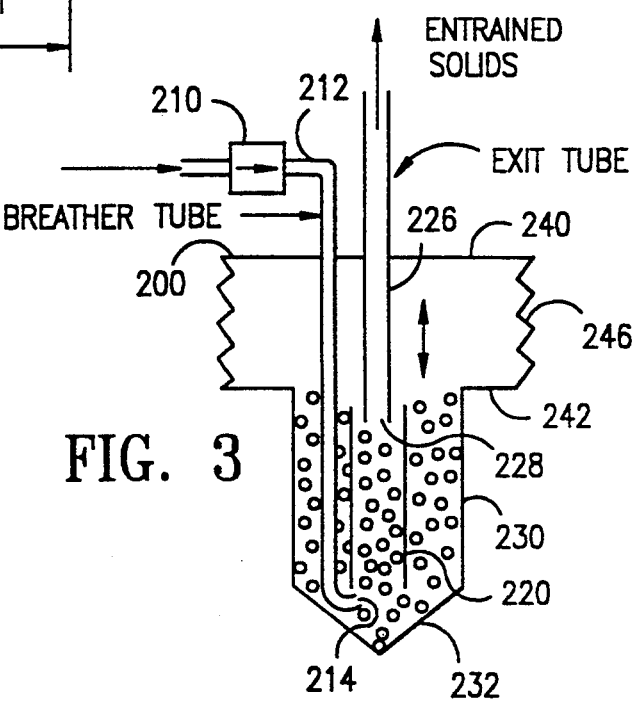
FIG. 3 shows a preferred embodiment, with a solids confinement tube in a solids reservoir and fluidizing vacuum relief tube.

FIG. 3 (Invention) shows a preferred embodiment well suited to multiple uses or precise metering of single uses.

Solids feeder 200 has bellows 246 between upper and lower bellows surfaces 240 and 242, respectively. Exit tube 226 is attached to upper surface 240, having a lower end extending into confinement means 220 immersed within solids reservoir 230. As bellows 246 is compressed, the inlet 228 of tube 226 descends into the open, cylindrical confinement means 220. Gas displaced by the bellows flows through inlet 228 and removes, by entrainment, particulates in the confinement means.

Depending on the relative size of bellows 240 to confinement means 220, it may be possible to recharge the confinement means by shaking the device enough to get more particulates into cylinder 220 and then continuing to compress bellows 246. Usually the bellows will be sized for a single sweep of the tube, so that the bellows will be decompressed before during or after additional solids are transferred into the confinement cylinder 220.

While reverse flow of gas via exit tube 226 is possible, it is preferred to provide a breather tube or vacuum breaker means comprising tube 212, check valve 210, and outlet 214 within the device. Preferably the outlet 214 is in a lower portion of the solids reservoir 230, most preferably near or under the base of the confinement means 220.

Decompressing the bellows will permit refill gas to flow through tube 212 into the base of the confinement tube. The gas will tend to fluidize the particulates in the device, and lift solids into the confinement tube. The action will be something like a percolator, or thermosiphon reboiler. Because the diameter of the confinement cylinder is larger than the diameter of tube 226, the superficial vapor velocity in the cylindrical confinement means will be lower for a given flow rate of gas than in the exit tube, so that bed expansion or bubbling bed fluidization rather than dilute phase particulate transport is achieved.

Refilling the device in this way, using vacuum breaker gas to fluidize solids and lift them into the confinement means from the reservoir, can achieve a fairly reliable refill of the cylindrical tube despite dropping levels of solids in the reservoir. Solids will flow up the cylindrical tube and usually overflow into the solids reservoir. When the bellows is relaxed or decompressed to the desired extent the flow of gas through outlet 214 will stop. The bed will deaerate both in the cylinder 220 and in the solids reservoir 230. Even as the amount of solids decreases in reservoir 230 there will usually be enough traffic through cylinder 220 to ensure that cylinder will be full of fluidized solids.

The confinement means may be of any shape, though a vertical cylinder, open at the top and bottom is preferred. A honeycomb, square, rectangular, or other cross section may be used, but a circular cross section simplifies the design.

Similarly the solids reservoir may have any desired cross section, but preferably has a shape similar to that of the confinement means. A cylindrical solids reservoir, open at the top and having a hemispherical or inverted funnel shape at the base is preferred to feed solids into the base of the confinement means.

The breather tube 212 and the outlet tube 240 may each have a check valve to prevent flow reversal, and each may have an orifice or other restriction to control flow. The breather tube should have a check valve to prevent a flow reversal of solids out of the breather tube. An orifice restriction, or careful sizing of the breather tube 212 will help regulate gas flow into the base of the confinement tube.

When a breather tube is used, it is usually beneficial to provide some means for preventing backflow through outlet tube 240 during a bellows expansion cycle.

Figure 4:
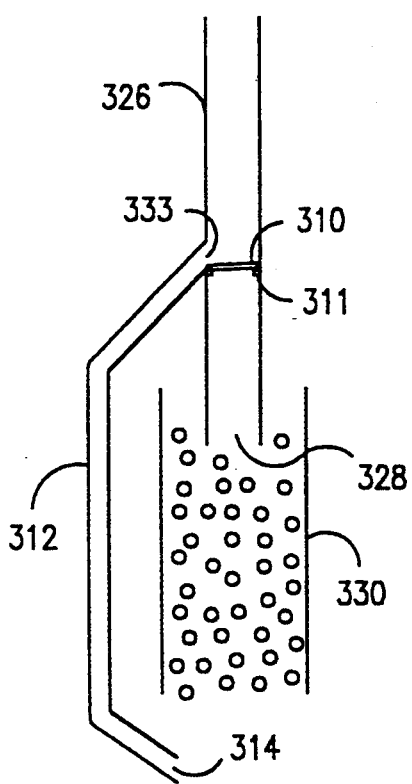
FIG. 4 shows an embodiment with the vacuum relief tube sharing the fluidized solids outlet.

It is possible to combine the breather tube and exit tube using the configuration shown in FIG. 4. Only details of the breather tube, exit tube, and confinement tube are shown. Exit tube 326 is attached to a compressible portion of the bellows, not shown, and terminates in inlet 328 immersed in confinement tube 330. Gas, typically air, flows through tube 326 to breather tube 312 which terminates in outlet 314.

During bellows expansion flapper 310 falls down against seat 311, diverting air or other gas via opening 333 into tube 312. During bellows compression, gas flows up outlet tube 326 and lifts flapper 310.

Breather tube 312 may be sealed by immersion in particulates or with a check valve, not shown, but for many applications a check valve will not be necessary.

The process and apparatus of the present invention may be used to dispense particulates ranging from FCC catalyst to pesticides to white powder used to mark athletic fields.

The preferred bellows and reservoir arrangement is that shown in the figures, but the bellows may also be vertical, and alongside of rather than over, the solids reservoir. An appropriate mechanical linkage may be used to cause the outlet tube to descend into the reservoir as the bellows is collapsed.

The fluidizing and transport gas may be air, light or heavy hydrocarbons or other inert or reactive gasses.

We claim:

1. An apparatus for delivering solid particulates comprising:
    a collapsible sealed vessel containing a volume of gas and an outlet for fluidizable solids entrained in gas;
    a solids reservoir within said sealed vessel;
    an exit tube affixed to a top portion of the collapsible sealed vessel and movable relative to said solids reservoir for fluidizable solids having an inlet within said reservoir and an outlet connected to said outlet of said sealed vessel, said exit tube descending into said reservoir as said sealed vessel is collapsed, and a breather tube passing through said sealed vessel and having an outlet within said solids reservoir.

2. The apparatus of claim 1 wherein:

said sealed vessel includes a collapsible bellows having an upper horizontal surface separated from a lower horizontal surface by an accordion fold bellows;

said exit tube is a rigid tube attached to said upper surface and extending down into said solids reservoir having a base and formed in said lower horizontal surface.

3. The apparatus of claim 2 wherein said solids reservoir also contains within it a vertical, cylindrical confinement means having a top opening receiving said rigid tube and a bottom opening spaced from said base of said solids reservoir.

4. The apparatus of claim 1 wherein said breather tube outlet is beneath said confinement means.

5. The apparatus of claim 1 wherein said breather tube has a check valve means preventing flow of gas from said sealed vessel.

6. The apparatus of claim 1 wherein said solids reservoir is a vertical cylinder, open at a top portion thereof to said vessel.

7. The apparatus of claim 6 wherein said solids reservoir has a hemispherical or inverted funnel shaped base.

8. An apparatus for delivering solid particulates comprising:

a collapsible sealed vessel having in an upper portion thereof a collapsible bellows having an upper horizontal surface having a diameter D2 separated from a lower horizontal surface by an accordion fold bellows and containing a volume of gas and an outlet for fluidizable solids entrained in gas;

a solids reservoir affixed to or within said lower horizontal surface, said solids reservoir having an open, vertical, cylindrical tube, having a diameter D1, solids confinement means disposed within said reservoir, said confinement means having an opening at an upper portion thereof receiving an exit tube for fluidizable solids and an opening at a lower portion thereof receiving solids from said solids reservoir, and wherein the ratio D2/D1 is 2.5 to 5;

said exit tube for fluidizable solids connected at one end to said upper collapsible surface and at another end thereof to an inlet descending into said reservoir as said bellows is collapsed, and a breather tube passing through said sealed vessel and having an outlet within said solids reservoir.

9. The apparatus of claim 8 comprising a breather tube passing through said sealed vessel and having an outlet within said solids reservoir.

10. The apparatus of claim 9 wherein said breather tube outlet is beneath said confinement means.

11. The apparatus of claim 9 wherein said solids reservoir is a vertical cylinder, open at a top portion thereof to lower horizontal surface.

12. A method of dispensing fluidizable solids comprising providing the apparatus of claim 1, charging said fluidizable solids to the apparatus and collapsing said apparatus to displace gas from said sealed vessel and remove solids by entrainment into said exit tube.

* * * * *